(12) United States Patent  
Saenglongma

(10) Patent No.: US 9,396,494 B1  
(45) Date of Patent: Jul. 19, 2016

(54) CARSHARING PERIL ANALYSIS

(71) Applicant: Liberty Mutual Insurance Company, Boston, MA (US)

(72) Inventor: Khamla Saenglongma, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 4 days.

(21) Appl. No.: 14/204,956

(22) Filed: Mar. 11, 2014

Related U.S. Application Data

(60) Provisional application No. 61/785,414, filed on Mar. 14, 2013.

(51) Int. Cl.
*G06Q 40/00* (2012.01)
*G06Q 30/06* (2012.01)
*G06Q 40/08* (2012.01)

(52) U.S. Cl.
CPC ............ *G06Q 30/0645* (2013.01); *G06Q 40/08* (2013.01)

(58) Field of Classification Search
CPC ....... G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,761,062 | B2 * | 7/2010 | Mervine ................ | G08G 1/205 455/557 |
| 8,577,703 | B2 * | 11/2013 | McClellan ............. | G06Q 40/02 705/7.11 |
| 2006/0259353 | A1 | 11/2006 | Gutmann | |
| 2006/0278783 | A1 * | 12/2006 | Rubin ................. | G09F 15/0037 248/230.1 |
| 2007/0093215 | A1 * | 4/2007 | Mervine ................ | G08G 1/205 455/99 |
| 2008/0195428 | A1 | 8/2008 | O'Sullivan | |
| 2011/0213629 | A1 | 9/2011 | Clark | |
| 2012/0149341 | A1 * | 6/2012 | Tadayon .............. | H04B 5/0062 455/412.1 |
| 2014/0309842 | A1 * | 10/2014 | Jefferies ................. | G07B 15/00 701/31.5 |
| 2014/0379385 | A1 * | 12/2014 | Duncan .................... | G07C 5/00 705/4 |

* cited by examiner

*Primary Examiner* — Frantzy Poinvil
(74) *Attorney, Agent, or Firm* — Christensen O'Connor Johnson Kindness PLLC

(57) ABSTRACT

Peril analysis is performed for carsharing insurance, i.e., peer-to-peer vehicle sharing insurance. The peril analysis is used to calculate the rate of and/or price insurance for carsharing. A renter may purchase insurance for carsharing (fully, as a supplement or going above and beyond a standard offering, or filling a gap between the minimal level a carsharing company provides and what a driver desires to provide for himself and vehicle's occupants, including comprehensive, collision, or a combination) using a mobile device, an embedded device, a vehicle, or an in-dash unit in the vehicle.

8 Claims, 16 Drawing Sheets

CARSHARING PERIL ANALYSIS

CROSS-REFERENCE TO RELATED APPLICATION

This application claims the benefit of Provisional Application No. 61/785,414, filed Mar. 14, 2013, which is incorporated herein by reference.

TECHNICAL FIELD

The subject matter is generally related to peril analysis, and more particularly, it relates to calculating insurance rates for carsharing.

BACKGROUND

Carsharing, or car sharing, is a model of car rental where people rent cars for short periods of time, often by the hour. They are attractive to modern customers who may temporarily use a vehicle as well as to others who would like occasional access to a vehicle of a different type than they use day-to-day. The organization renting the cars may be a commercial business or users who are organized as a democratically controlled company, public agency, cooperative, or an ad-hoc grouping. Carsharing contributes to sustainable transportation because it is a less car-intensive means of urban transport. Carsharing has been said to reduce car ownership at an estimated rate of one rental car per 15 owned vehicles.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter is a system form which recites a system comprising a vehicle not owned by a renter. The system further recites a mobile device, the hardware of which is suitable for limiting operation of the vehicle by distance and time when the mobile device is inside the vehicle unless the mobile device receives instructions from the renter to purchase carsharing insurance sufficient to operate the vehicle to a destination selected on the mobile device by the renter.

Another aspect of the present subject matter is a method form that recites a method comprising downloading a driver score and driving limits of a renter from a cloud network. The method also recites limiting operation of a vehicle not owned by the renter by the driving limits. The method additionally recites calculating carsharing insurance options to the renter based on the driver score. The method subsequently recites electronically displaying on a device the carsharing insurance options. The method consequentially recites determining whether a current insurance coverage of the vehicle is adequate. The method suitably recites electronically displaying the adequacy of the current insurance coverage. The method further recites electronically soliciting purchase of carsharing insurance options to continue. The method yet further recites electronically presenting a price for each carsharing insurance option. The method finally recites electronically facilitating operation of the vehicle if the renter has selected to purchase a carsharing insurance option that adequately provides insurance coverage for the vehicle.

A tertiary aspect of the present subject matter is a system form that recites a system comprising a vehicle not owned by a renter. The system further recites an in-dash unit housed in the vehicle, the hardware of which is suitable for limiting operation of the vehicle by distance and time when the renter is detected to be inside the vehicle unless the in-dash unit receives instructions from the renter to purchase carsharing insurance sufficient to operate the vehicle to a destination selected on the in-dash unit by the renter.

A fourth aspect of the present subject matter is a computer-readable medium form which recites a non-transitory computer-readable medium having computer-executable instructions stored thereon for implementing a method, comprising downloading a driver score and driving limits of a renter from a cloud network. The method also recites limiting operation of a vehicle not owned by the renter by the driving limits. The method additionally recites calculating carsharing insurance options to the renter based on the driver score. The method subsequently recites electronically displaying on a device the carsharing insurance options. The method consequentially recites determining whether a current insurance coverage of the vehicle is adequate. The method suitably recites electronically displaying the adequacy of the current insurance coverage. The method further recites electronically soliciting purchase of carsharing insurance options to continue. The method yet further recites electronically presenting a price for each carsharing insurance option. The method finally recites electronically facilitating operation of the vehicle if the renter has selected for purchase a carsharing insurance option that adequately provides insurance coverage for the vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Various embodiments of the present subject matter are directed to peril analysis for carsharing insurance. A number of embodiments are directed to peril analysis for peer-to-peer vehicle sharing insurance. A number of embodiments are directed to a method to calculate a rate for and/or price insurance using peril analysis for carsharing. A few embodiments are directed to a method to purchase insurance for carsharing (fully, as a supplement or going above and beyond a standard offering, or filling a gap between the minimal level a carsharing company provides and what a driver desires to provide for himself and vehicle's occupants, including comprehensive, collision, or a combination) using a mobile device, an embedded device, a vehicle, or an in-dash unit in the vehicle. The vehicle may be a free vehicle or a renter's selected vehicle.

Figure 1:
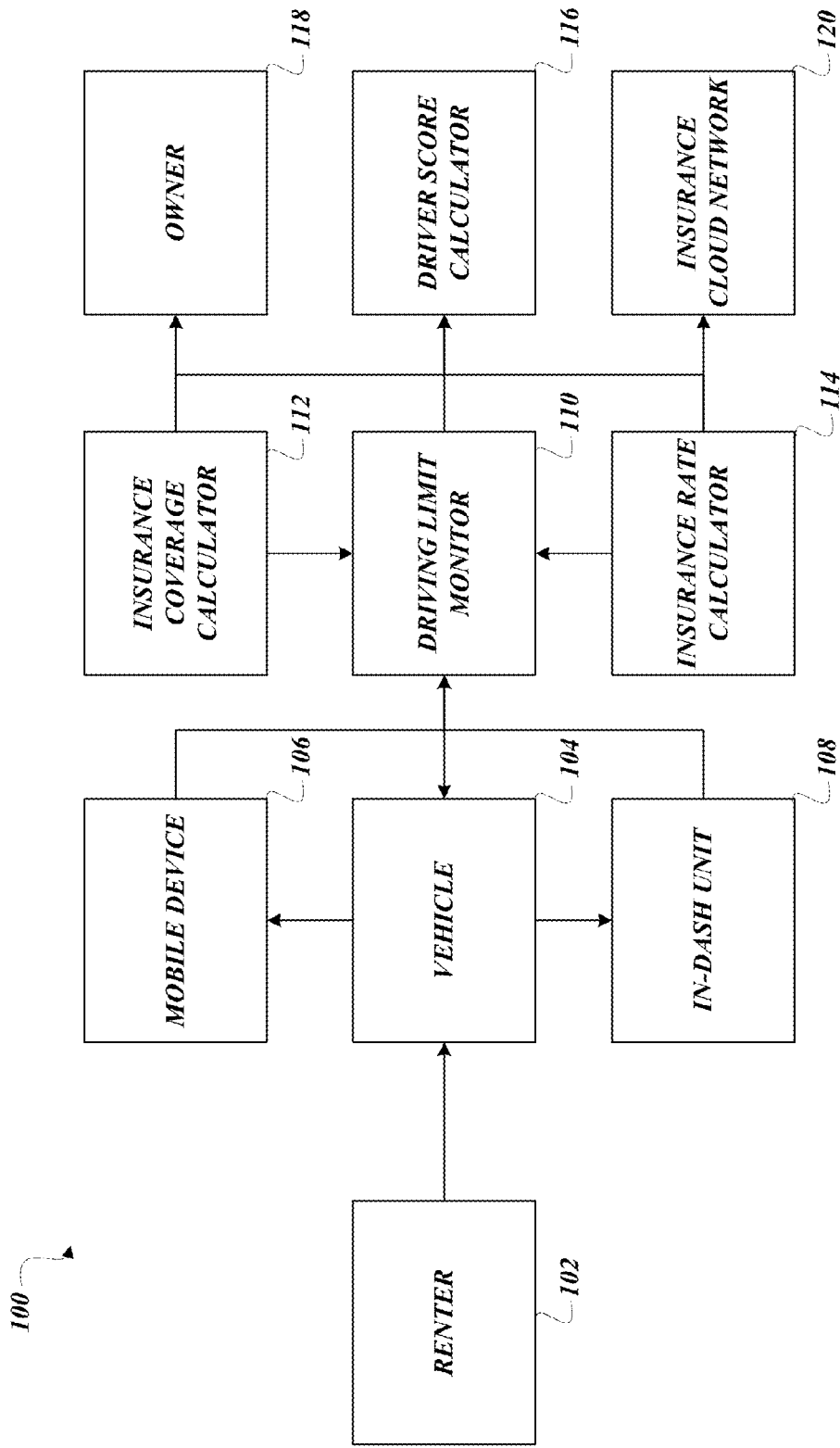
FIG. 1 is a block diagram illustrating an archetypical system, the hardware structures of which are suitable for peril analysis of carsharing.

FIG. 1 illustrates a system 100 in which a renter 102 enters a vehicle 104. The vehicle 104 may or may not be owned by the renter 102. It is at least owned by an owner 118. The presence of the renter 102 in the vehicle 104 is detected by a mobile device 106 (that may be carried by the renter 102), the vehicle 104, or the in-dash unit 108. The renter 102 may manually announce his presence by actuating his mobile device 106, the vehicle 104, or the in-dash unit 108. The term actuating here means the inclusion of entering or audibly reciting his information into the mobile device, the vehicle 104, or the in-dash unit 108. The detection of the renter 102 is then communicated to the system 100, and more particularly, an insurance cloud network of computers 120.

The insurance cloud network 120 communicates a driver score associated with the renter 102 to the mobile device 106, the vehicle 104, or the in-dash unit 108. The insurance cloud network 120 communicates to the renter 102 how the vehicle 104 is being used. The insurance cloud network 120 further communicates associated driving limits of the renter 102 to a driving limit monitor 110. The driving limit monitor 110 communicates with the mobile device 106, the vehicle 104, or the in-dash unit 108 whose hardware structures are suitable for actuating settings in the vehicle 104 to limit its operation to a time and distance preset by the communicated driving limits associated with the renter 102. The driving limit monitor 110 includes a hardware structure to monitor whether the renter 102 has operated the vehicle 104 beyond the driving limits. The renter 102, while in the vehicle 104, may be presented through the mobile device 106, the vehicle 104, or the in-dash unit 108 with various insurance coverage options which are calculated by the hardware structure of an insurance coverage calculator 112. An insurance rate connected with an insurance coverage option is calculated by the hardware structure of an insurance rate calculator 114. The calculated insurance rates are also provided to the renter 102 via the mobile device 106, the vehicle 104, or the in-dash unit 108. While the renter 102 is driving the vehicle 104, his driving score is continuously calculated by the hardware structure of a driver score calculator 116. His driving score is communicated to the insurance cloud network 120, the hardware structure of which stores the refreshed driver score associated with the renter 102.

Figures 2A, 2B:
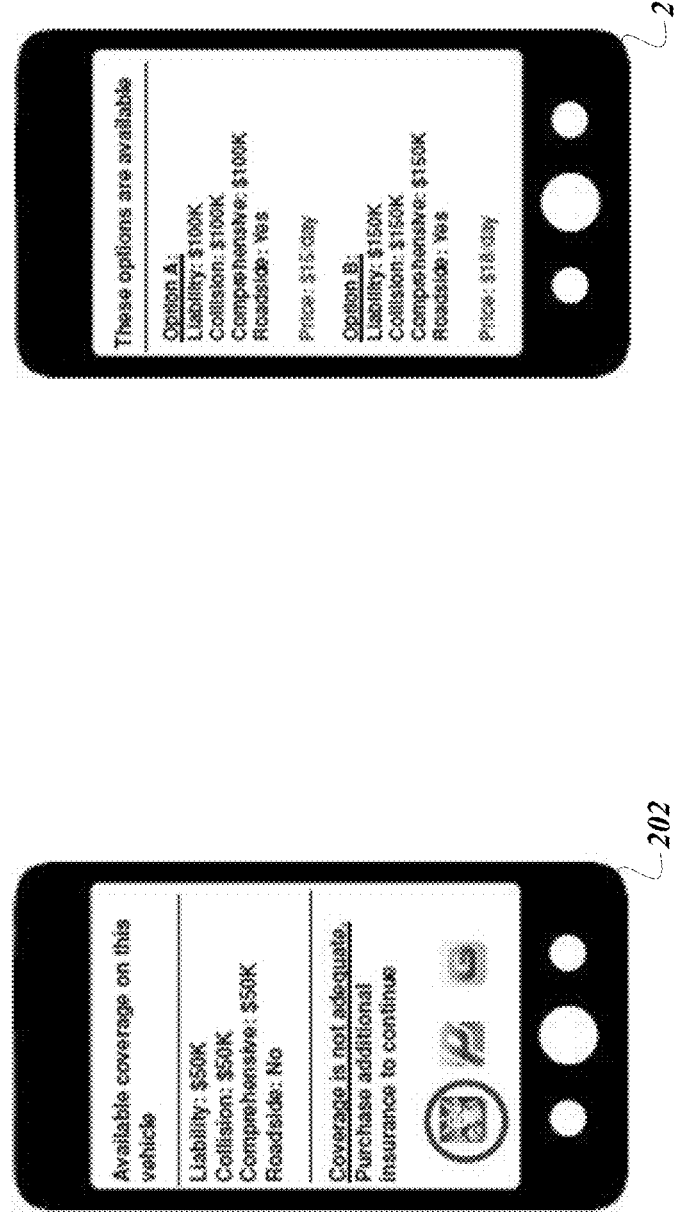
FIGS. 2A-2B are pictorial diagrams of exemplary carsharing user interfaces on mobile devices.

FIGS. 2A-2B illustrate exemplary user interfaces on the mobile device 106 for communicating carsharing insurance coverage options as well as insurance rates connected with the various options to the renter 102. FIG. 2A specifically illustrates a piece of user interface 202 on the mobile device 106. A banner element at the top of the user interface 202 appears as "Available Coverage On This Vehicle." Below the banner element is situated a coverage element listing various carsharing insurance coverage options available to the renter 102: "Liability: $50K"; "Collision: $50K"; "Comprehensive: $50K"; and "Roadside: No." Below the coverage element is an adequacy element, which is a textual description of whether the present insurance coverage, without additional insurance coverage recited by the coverage element, connected with the renter 102 is adequate. The adequacy element expresses "Coverage is Not Adequate. Purchase Additional Insurance to Continue." Below the adequacy elements are icons, each of which represents an insurer that is available to provide insurance coverage to the renter 102. The currently selected one is encircled. In the user interface 202, there are three icons displayed.

FIG. 2B illustrates another piece of user interface 204 which is presented to the renter 102 when he has selected an insurance company to provide insurance coverage as presented on the piece of user interface 204. The piece of user interface 204 includes a banner element "These Options Are Available." Below the banner is listed various option elements. One option element is recited as follows: "Option A:"; "Liability: $100K"; "Collision: $100K"; "Comprehensive: $100K"; and "Roadside: Yes." A price element is presented below the option which is recited as "Price: $15/day". The piece of user interface 204 further presents another option element: "Option B:"; "Liability: $150K"; "Collision: $150K"; "Comprehensive: $150K"; and "Roadside: Yes." Another price element is also provided for the second option and it is recited as follows: "Price: $18/day." The renter may select one of these two presented options with different coverage ranges to obtain sufficient insurance coverage to operate the vehicle 104.

Figure 3C:
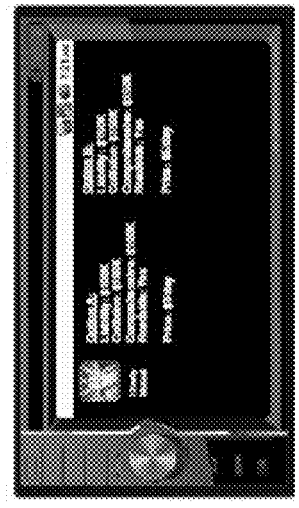
FIGS. 3A-3C are pictorial diagrams of exemplary carsharing user interfaces on an in-dash unit in a vehicle.
Figure 3B:
Figure 3A:
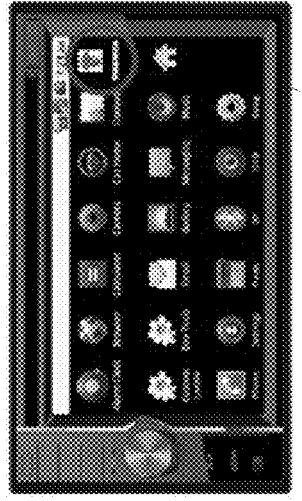

FIGS. 3A-3C illustrate pieces of user interface 302-306 that are presented on the in-dash unit 108 in the vehicle 104. FIG. 3A illustrates the piece of user interface 302 in which many icons are available to the renter 102 to select, including a carsharing insurance icon. The carsharing insurance icon is focused by the encircled line. Upon selection of the insurance icon, the piece of user interface 304 is presented to the renter 102. See FIG. 3B. The piece of user interface 304 contains a banner element "Enter Trip Information." Below the banner element is a driver score element connected with the renter 102 which appears as "Driver Score: 120." This driver score indicates that the renter 102 is a good driver. Below the driver score element is an occupant element which appears as "Car Has Detected Three Passengers." In a number of embodiments, the number of occupants is automatically detected by the mobile device 106, the vehicle 104, or the in-dash unit 108. In a few embodiments, the renter 102 enters the number of occupants. Below the occupant element is a destination element that can be selected by the renter 102 to specify the destination to which he will drive the vehicle 104. In this example, the piece of user interface element 304 provides a destination element of "Destination: Portland, Me." Below the destination element is a travel start date element which is selectable by the renter 102. In this example, the travel start date element is recited as follows: "Travel start date: 3/11/2016." Below the travel start date element is a travel end date element, which is recited as follows for this example: "Travel end date: 3/15/2016." The system 100 determines that the route/destination is less risky. Below the travel end date element is an adequacy element which is recited "Insurance Is Not Adequate For Your Trip."

A purchase element appears to the right of the adequacy element "Purchase→" indicating that the renter 102 may select the purchase element to be brought to the piece of user interface element 306. See FIG. 3C. The piece of user interface element 306 is divided into three columns. The first column includes a logo of the selected insurance company and below the logo is the name of the insurance company. The second column includes an option element for insurance coverage which is recited as follows: "Option A"; "Liability: $100K"; "Collision: $100K"; "Comprehensive: $100K"; and "Roadside: Yes." Below the first option element is a price element connected with that insurance coverage option which is recited as follows: "Price: $15/day." The third column presents another insurance coverage option element which is recited as follows: "Option B"; "Liability: $150K"; "Collision: $150K"; "Comprehensive: $150K"; and "Roadside: Yes." Below the option element is a price element connected with the second option and is recited as follows: "Price:

$18/day." Upon selection of one of the two options, the renter 102 is able to operate the vehicle 104.

Figures 4A, 4B, 4C:
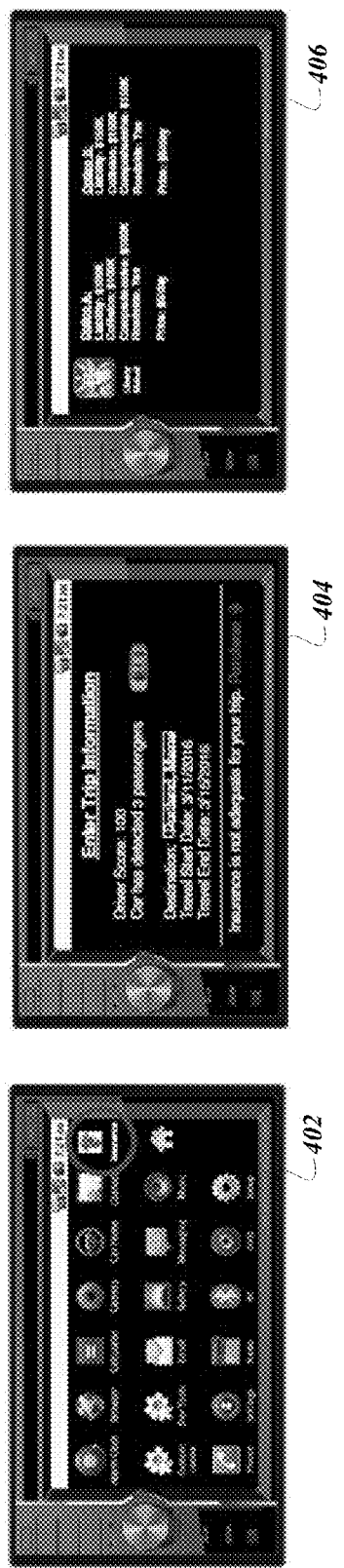
FIGS. 4A-4C are pictorial diagrams of exemplary carsharing user interfaces on an in-dash unit in a vehicle.

FIGS. 4A-4C illustrate various pieces of user interface 402-406 that are presented on the in-dash unit 108 in the vehicle 104. Some elements of the pieces of user interface 402-406 are similar to the elements of the pieces of user interface 302-306, and for the sake of brevity, they will not be further discussed. The driver score element of the piece of user interface 404 recites "Driver Score: 100." This indicates that the renter 102 is not a good driver, but a normal driver. The prices that are presented on the piece of user interface 406 may change from those presented in the piece of user interface 306.

Figure 5C:
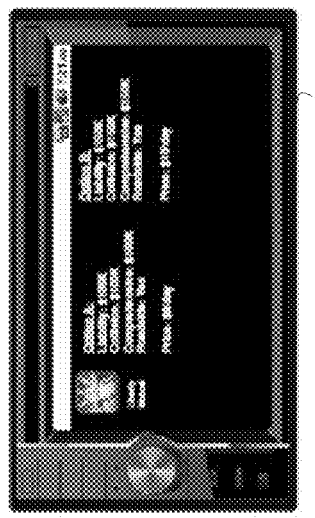
FIGS. 5A-5C are pictorial diagrams illustrating exemplary carsharing user interfaces on an in-dash unit in a vehicle.
Figure 5B:
Figure 5A:
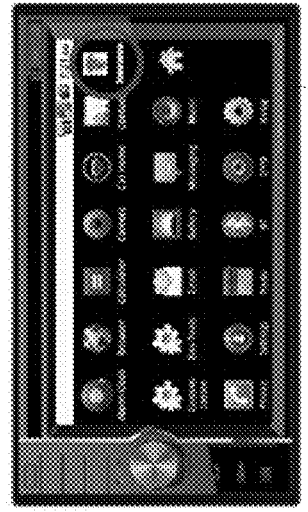

FIGS. 5A-5C illustrate the various pieces of user interface 502-506. Many elements of the pieces of user interface 502-506 are similar to those discussed before and for brevity purposes, they will not be further discussed here. The piece of user interface 504 illustrates a driver score element "Driver Score: 120" indicating that the renter 102 is a good driver. However, the destination element is displayed as "Destination: New York, N.Y.," indicating that it is a more risky route/destination. Hence, the piece of user interface 506 may present different prices connected with various coverage options for the renter 102.

Figure 6A:
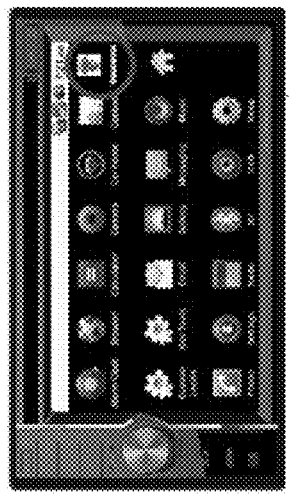
FIGS. 6A-6C are pictorial diagrams of exemplary carsharing user interfaces on an in-dash unit in a vehicle.
Figure 6B:
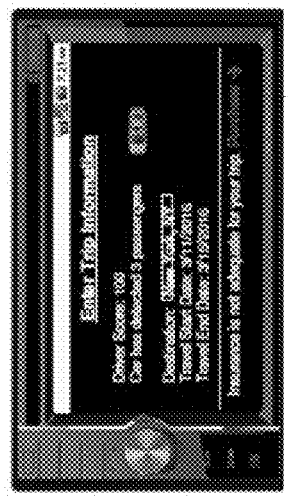
Figure 6C:
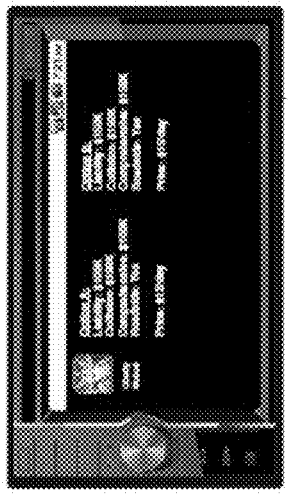
Figure 7A:
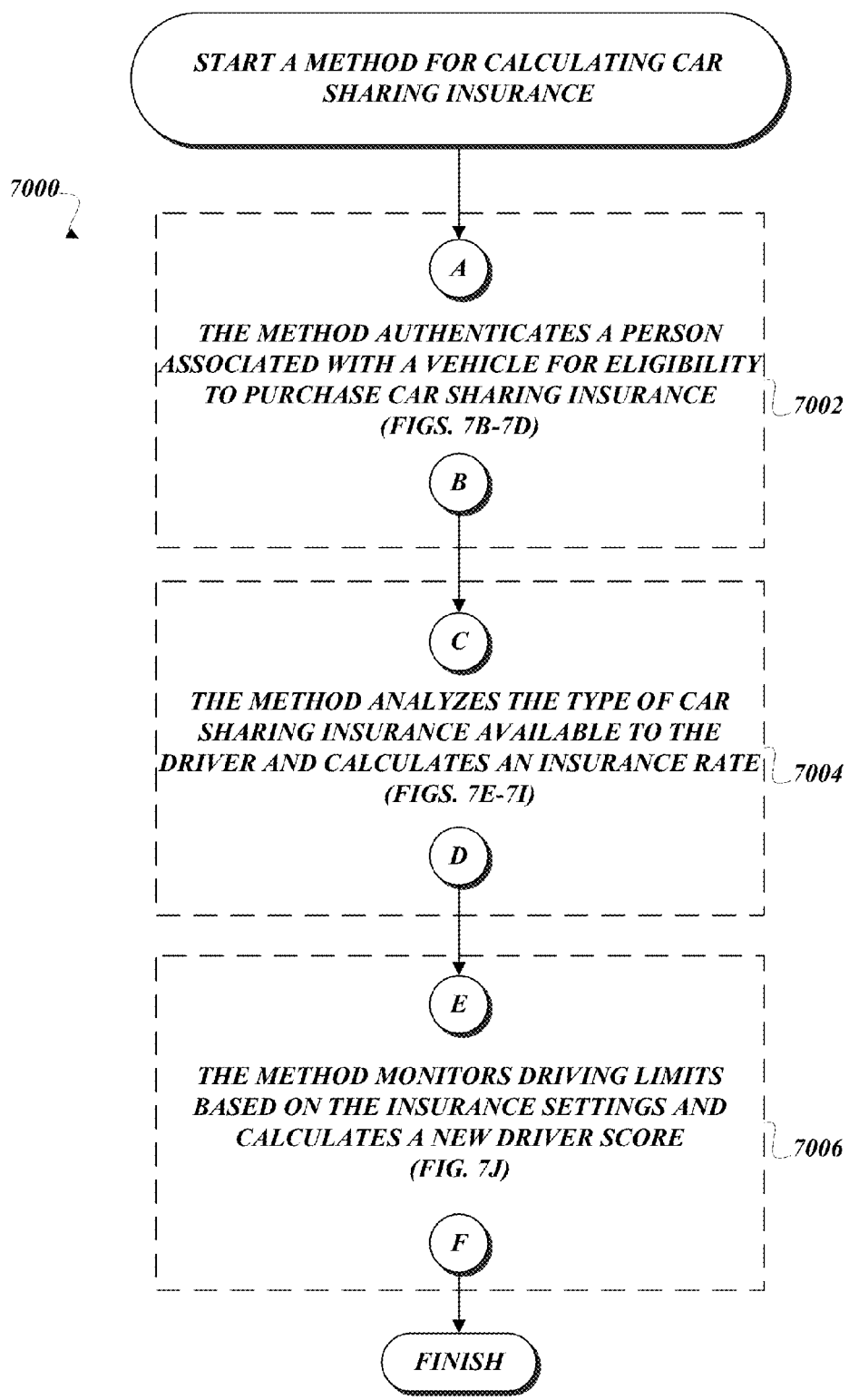
FIGS. 7A-7J are process diagrams implementing an exemplary method for calculating rates for carsharing insurance.
Figure 7B:
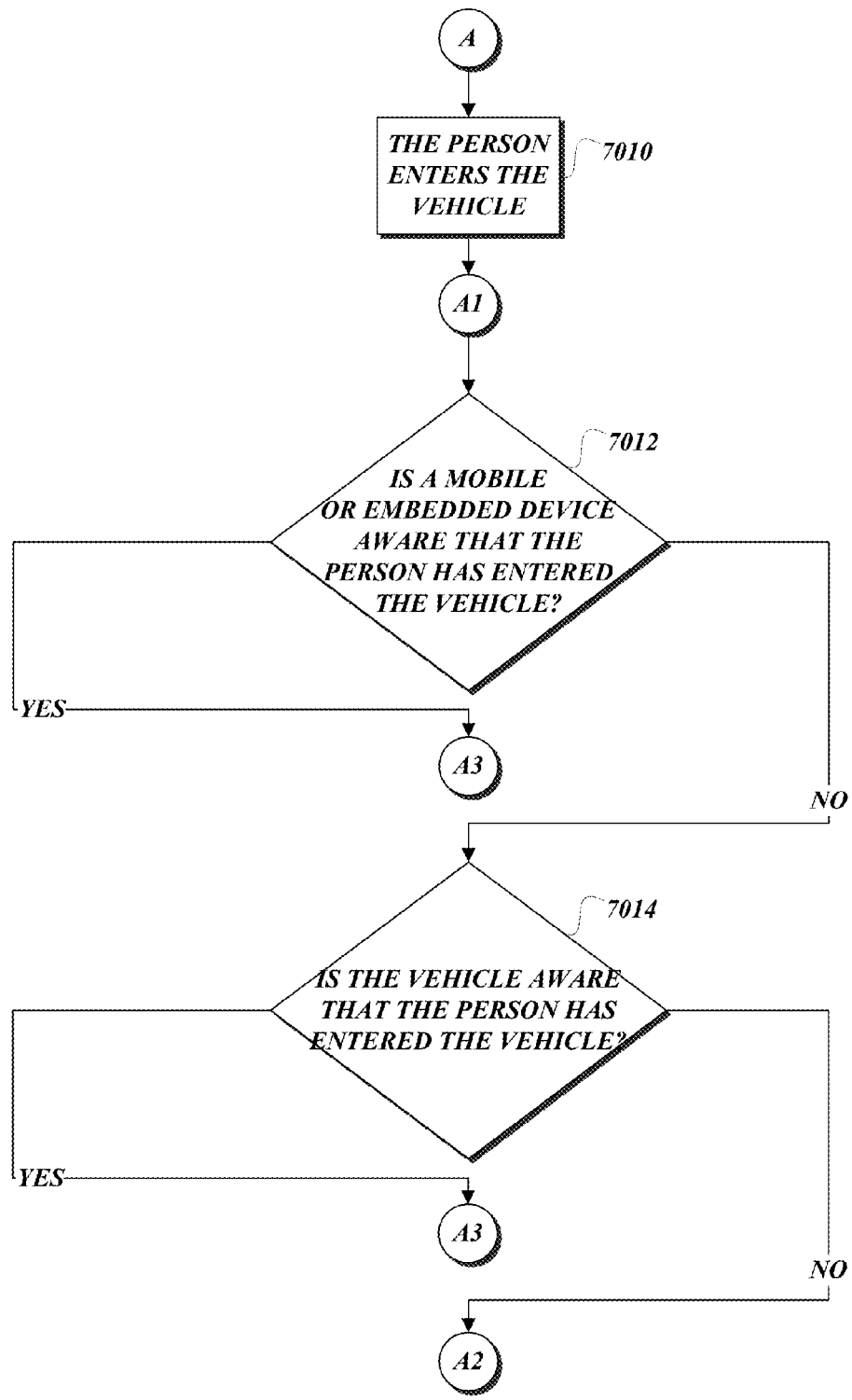
Figure 7C:
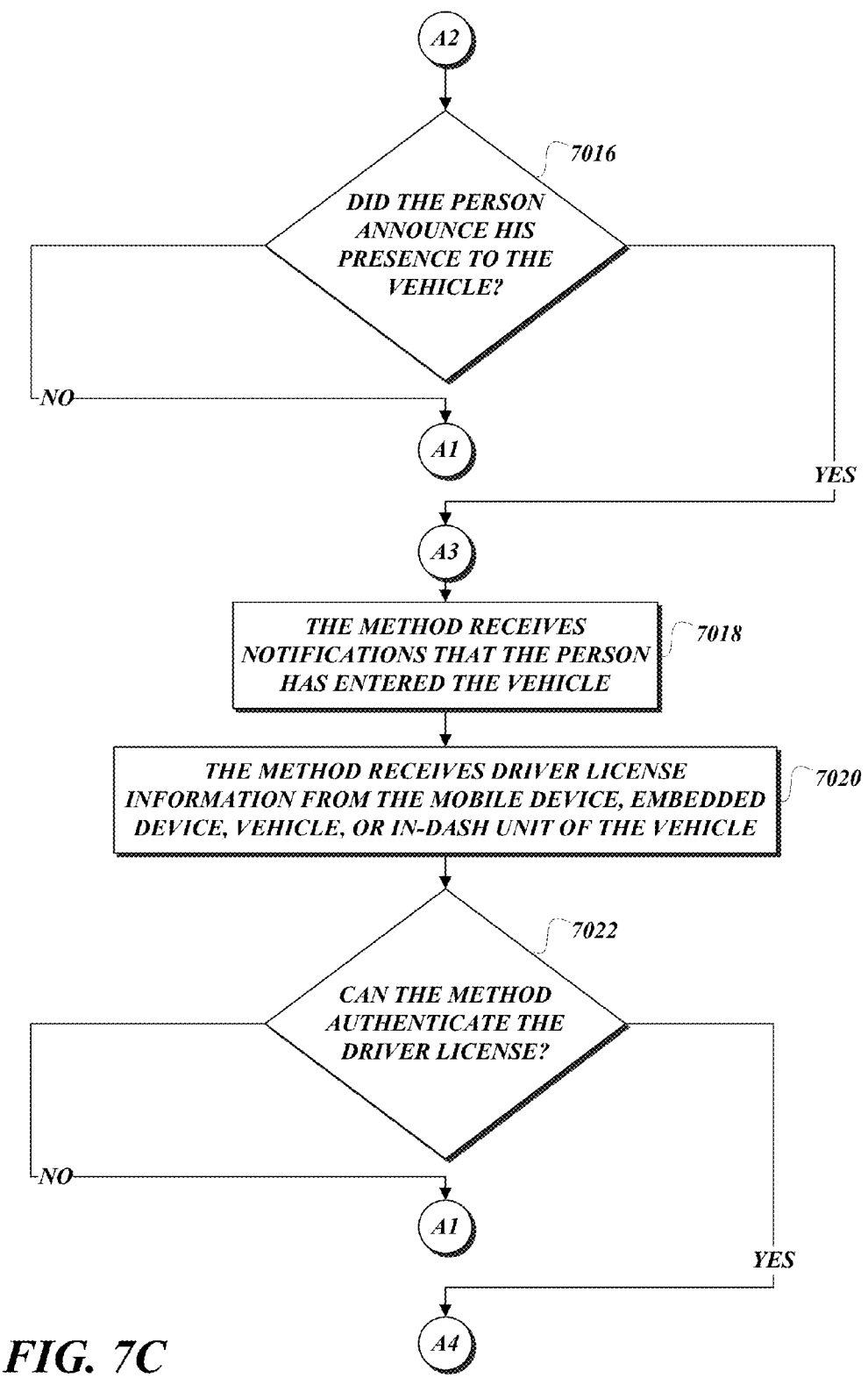
Figure 7D:
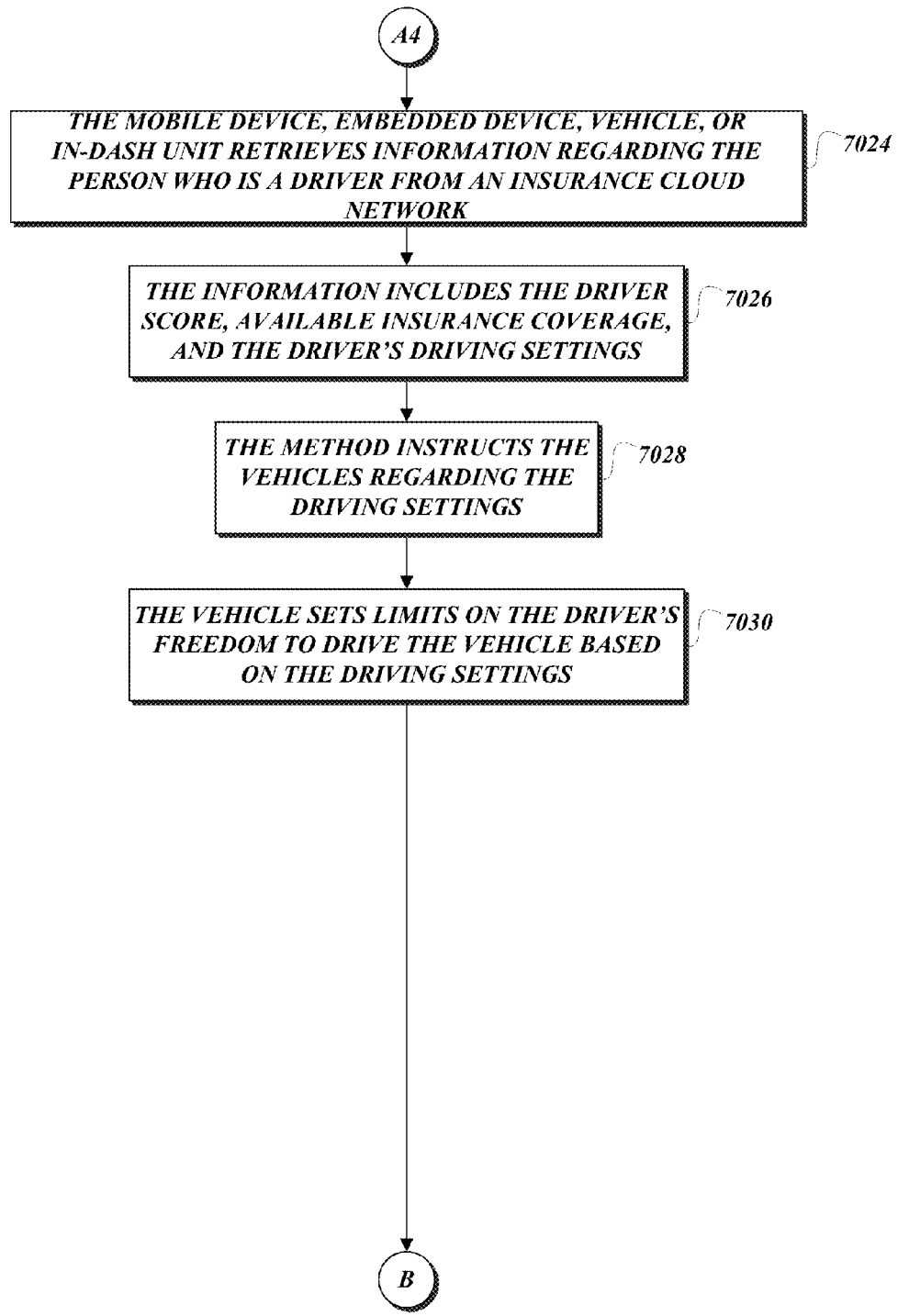
Figure 7E:
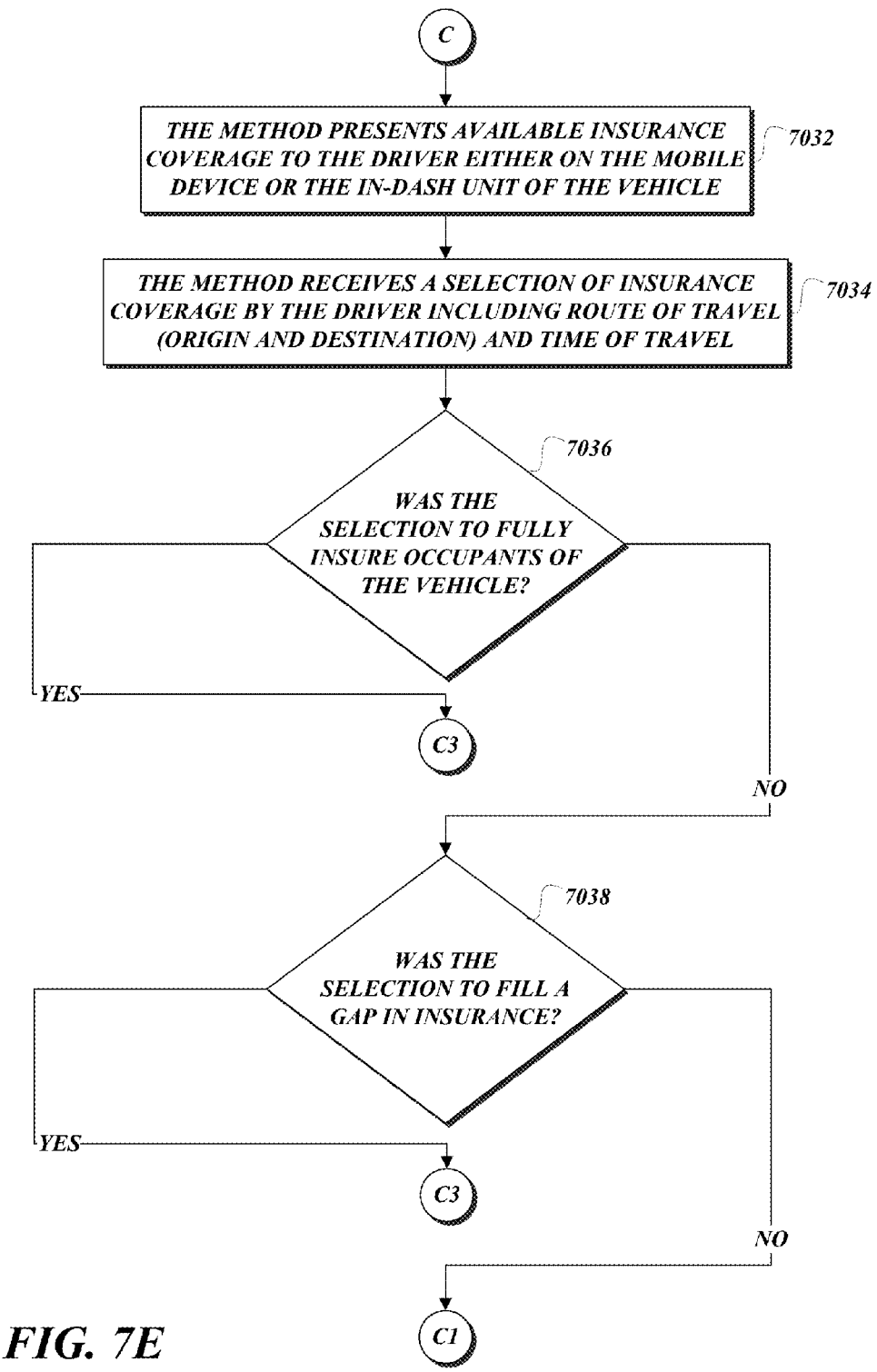
Figure 7F:
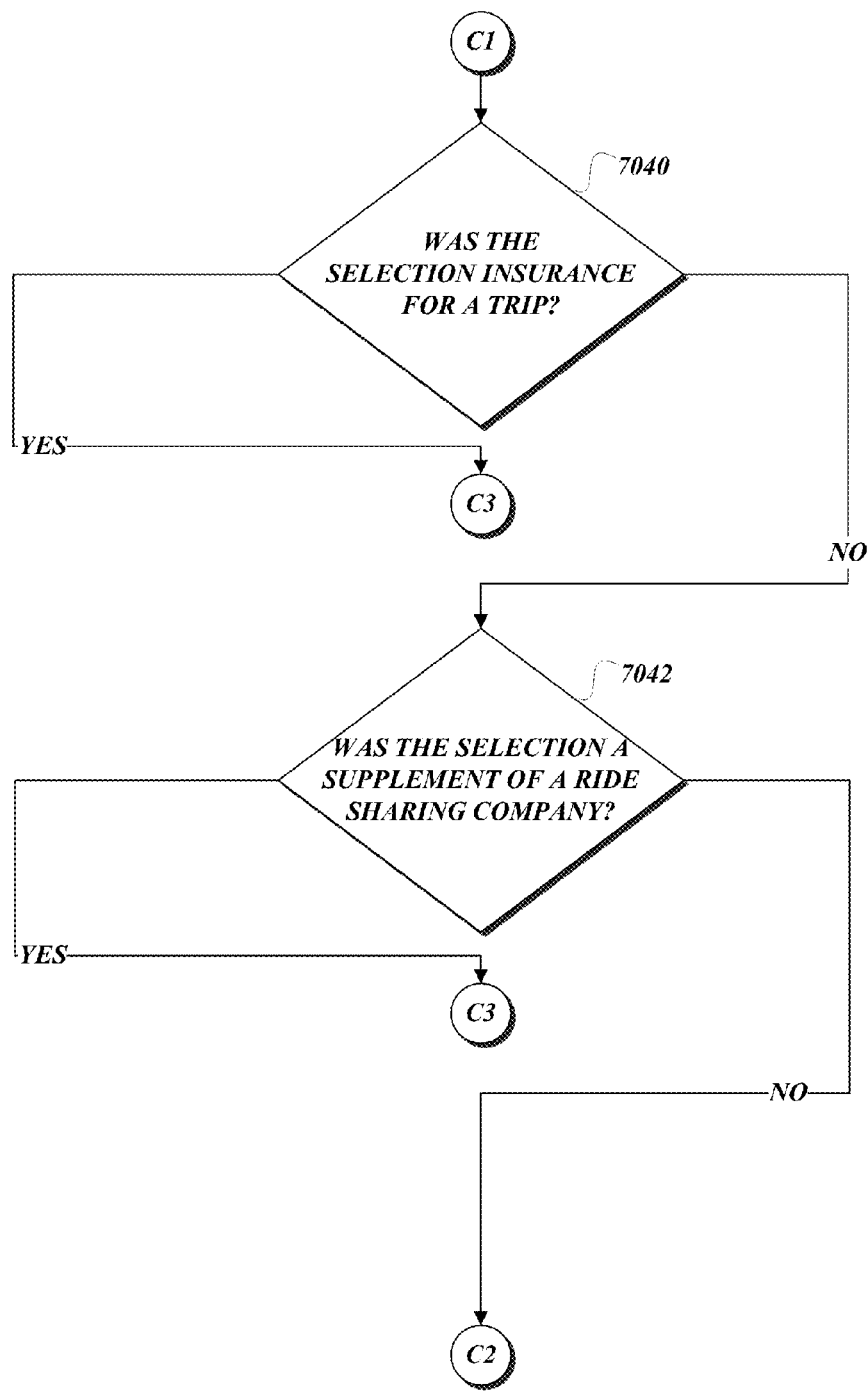
Figure 7G:
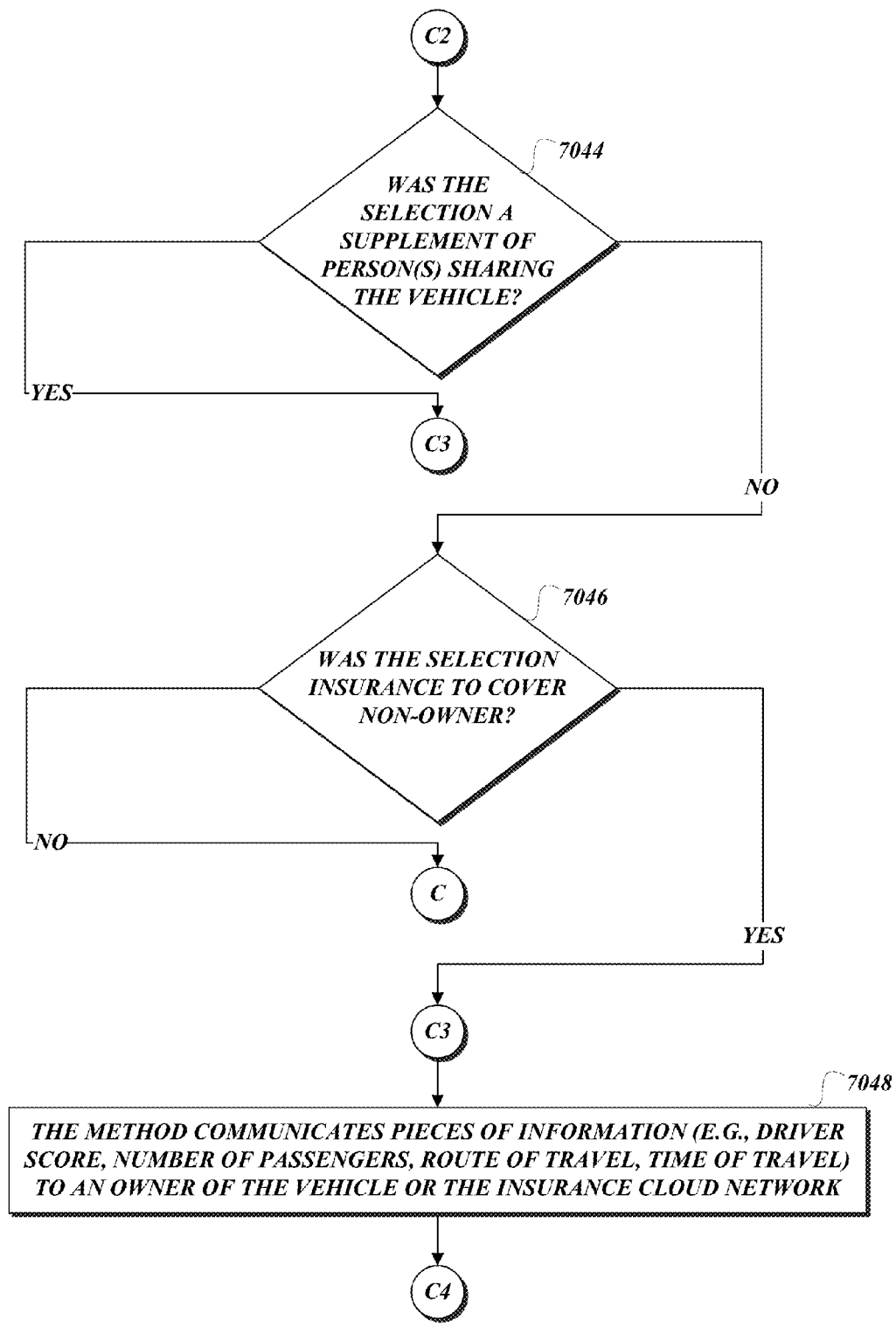
Figure 7H:
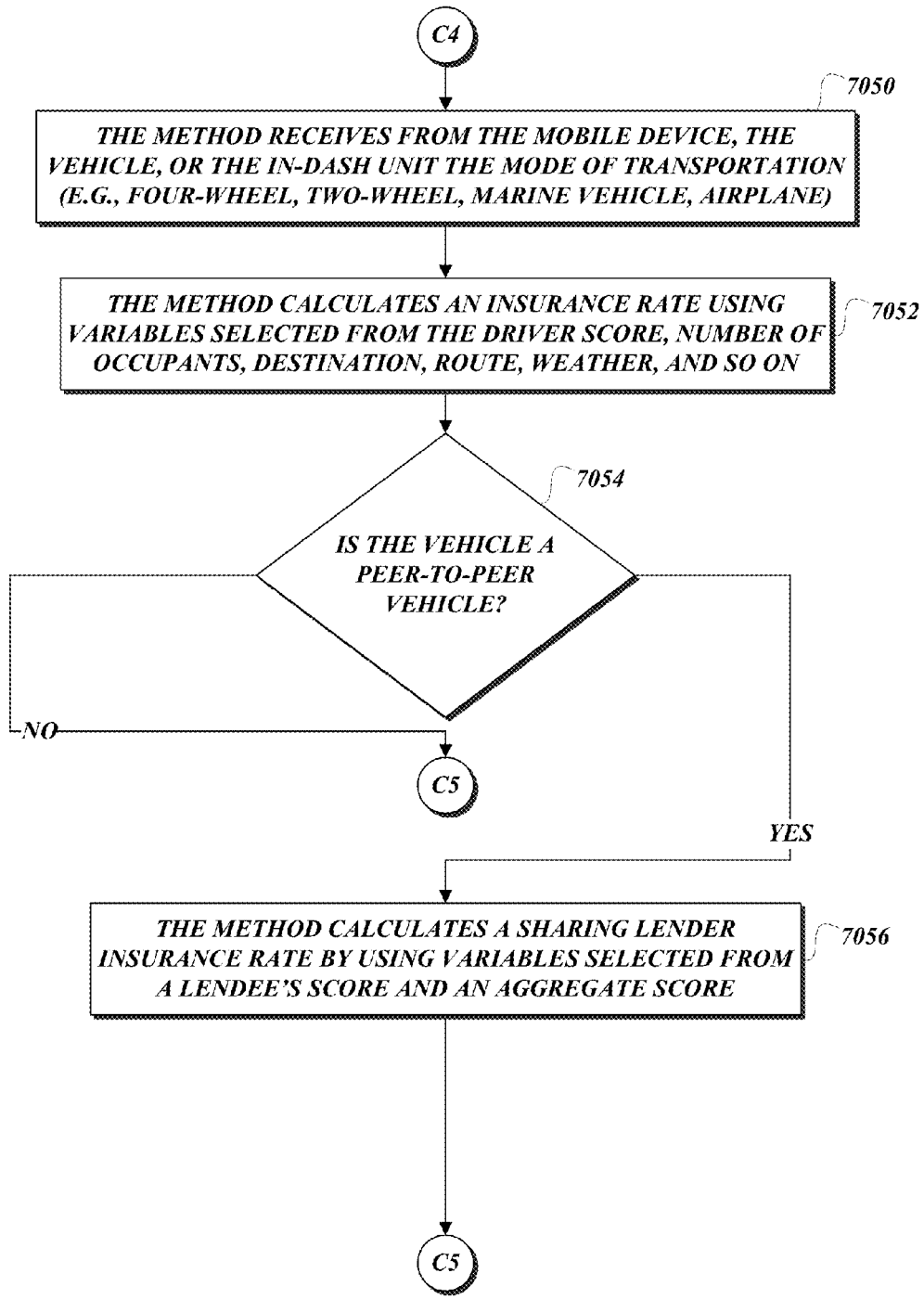
Figure 7I:
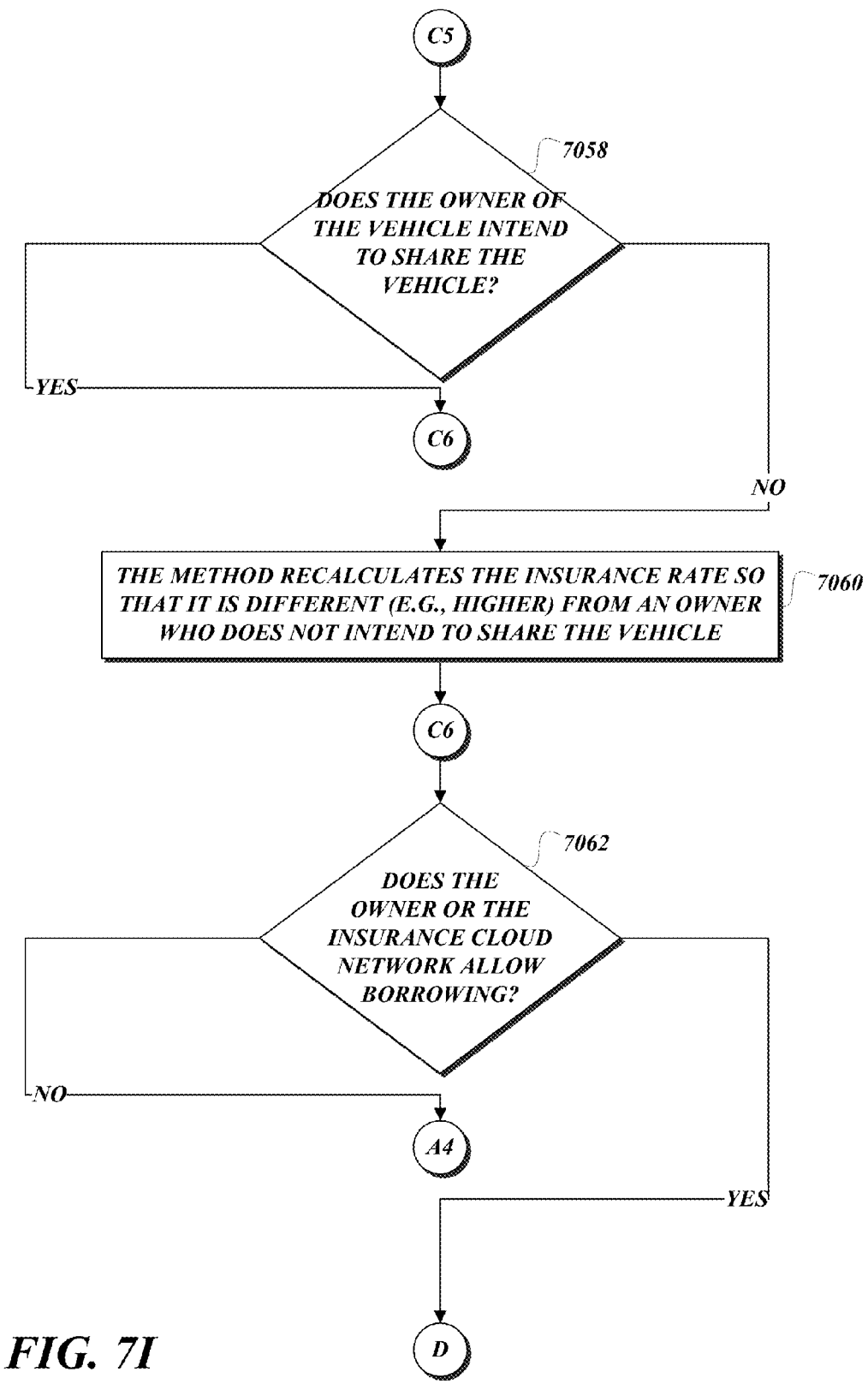
Figure 7J:
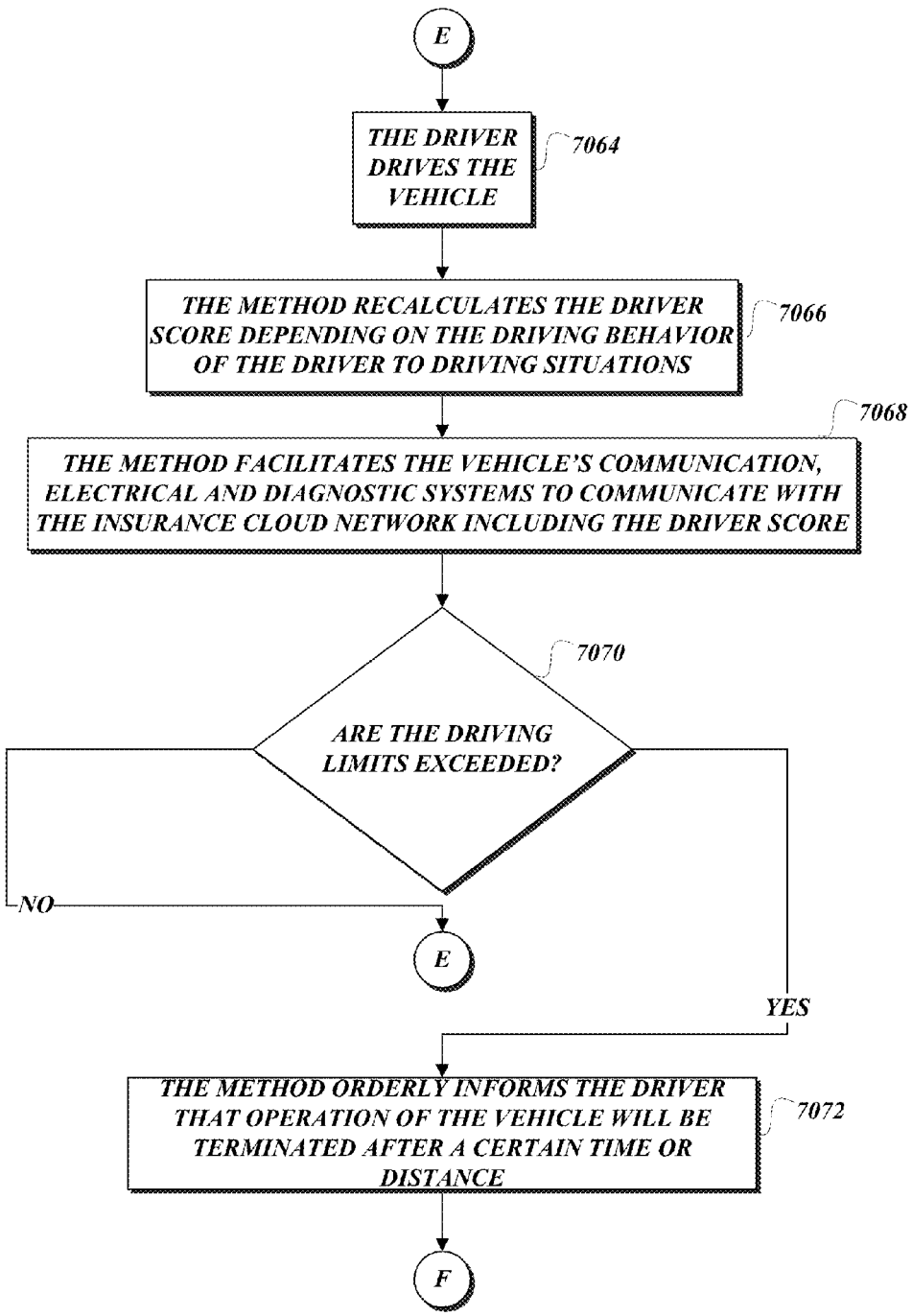

FIGS. 6A-6C illustrate pieces of user interface 602-606. Many elements of these pieces of user interface 602-606 are similar to those discussed before, and for brevity purposes, they will not be further explained here. The piece of user interface 604 includes a different driver score element: "Driver Score: 100." This indicates that the renter 102 is a normal driver. However, the destination element is presented as follows: "Destination: New York, N.Y." This indicates that the route is more risky or the destination is more risky. Hence, the piece of user interface 606 may reflect different prices for the various insurance coverage Options A, B.

FIGS. 7A-7J are process diagrams implementing an exemplary method 7000 for calculating rates for carsharing insurance. At the start block, the method 7000 proceeds to a set of method steps 7002 defined between a continuation terminal ("terminal A"), and another continuation terminal ("terminal B"). The set of method steps 7002 authenticates a person associated with the vehicle for eligibility to purchase carsharing insurance. From terminal A (FIG. 7B), the method proceeds to block 7010 where the person enters the vehicle, such as the vehicle 104. The method then continues to another continuation terminal ("terminal A1"). The method then proceeds to decision block 7012 where a test is performed to determine whether a mobile or an embedded device is aware that the person has entered the vehicle. If the answer to the test at decision block 7012 is Yes, the method continues to another continuation terminal ("terminal A3"). Otherwise, if the answer to the test at decision block 7012 is No, the method continues to another decision block 7014 where a test is performed to determine whether the vehicle is aware that the person has entered the vehicle. If the answer to the test at decision block 7014 is Yes, the method proceeds to terminal A3. Otherwise, if the answer to the test at decision block 7014 is No, the method proceeds to another continuation terminal ("terminal A2").

From terminal A2 (FIG. 7C), the method proceeds to decision block 7016 where a test is performed to determine whether the person announces his presence to the vehicle. If the answer to the test at decision block 7016 is No, the method proceeds to terminal A1 and skips back to decision block 7012 where the above-identified processing steps are repeated. Otherwise, if the answer to the test at decision block 7016 is Yes, the method proceeds to terminal A3 and further proceeds to block 7018 where the method receives notifications that the person has entered the vehicle. At block 7020, the method receives driver license information from the mobile device, embedded device, vehicle, or an in-dash unit of the vehicle. At decision block 7022, a test is performed to determine whether the method can authenticate the driver license. If the answer to the test at decision block 7022 is No, the method proceeds to terminal A1 and skips back to decision block 7012 where the above-identified processing steps are repeated. Otherwise, if the answer to the test at decision block 7022 is Yes, the method proceeds to another continuation terminal ("terminal A4").

From terminal A4 (FIG. 7D), the method 7000 proceeds to block 7024 where the mobile device, embedded device, vehicle, or in-dash unit retrieves information regarding the person who is a driver from an insurance cloud network. At block 7026, the information includes the driver score, available insurance coverage, and the driver's driving settings. At block 7028, the method instructs the vehicles regarding the driving settings. At block 7030, the vehicle sets limits on the driver's freedom to operate the vehicle based on the driving settings. The method then continues to terminal B.

From terminal B (FIG. 7A), the method 7000 proceeds to a set of method steps 7004 defined between a continuation terminal ("terminal C") and another continuation terminal ("terminal D"). The set of method steps 7004 analyzes the type of carsharing insurance options available to the driver and calculates an insurance rate. From terminal C (FIG. 7E), the method 7000 proceeds to block 7032 where the method presents available insurance coverage to the driver either on the mobile device or the in-dash unit of the vehicle. At block 7034, the method receives a selection of insurance coverage by the driver, including route of travel (origin and destination) and time of travel. The method then proceeds to decision block 7036 where a test is performed to determine whether the selection fully insures occupants of the vehicle. If the answer to the test at decision block 7036 is Yes, the method proceeds to another continuation terminal ("terminal C3"). Otherwise, if the answer to the test at decision block 7036 is No, the method proceeds to another decision block 7038 where another test is performed to determine whether the selection is to fill a gap in insurance. If the answer to the test at decision block 7038 is Yes, the method proceeds to terminal C3. Otherwise, if the answer to the test at decision block 7038 is No, the method proceeds to another continuation terminal ("terminal C1").

From Terminal C1 (FIG. 7F), the method 7000 proceeds to decision block 7040 where a test is performed to determine whether the insurance selection was for a trip. If the answer to the test at decision block 7040 is Yes, the method proceeds to terminal C3. Otherwise, if the answer to the test at decision block 7040 is No, the method proceeds to another decision block 7042. At decision block 7042, a test is performed to determine whether the selection was to supplement a minimum insurance coverage provided by a ride sharing company. If the answer to the test at decision block 7042 is Yes, the method proceeds to terminal C3. Otherwise, if the answer to the test at decision block 7042 is No, the method proceeds to another continuation terminal ("terminal C2").

From terminal C2 (FIG. 7G), the method proceeds to decision block 7044 where a test is performed to determine whether the selection was to supplement the person(s) sharing the vehicle. If the answer to the test at decision block 7044 is Yes, the method proceeds to terminal C3. Otherwise, if the answer to the test at decision block 7044 is No, the method proceeds to decision block 7066 where a test is performed to determine whether the selection was insurance to cover a non-owner. If the answer to the test at decision block 7046 is No, the method proceeds to terminal C and skips back to block 7032 where the above-identified processing steps are repeated. Otherwise, if the answer to the test at decision block 7046 is Yes, the method proceeds to terminal C3 (FIG. 7G), and further proceeds to block 7048 where the method communicates pieces of information (e.g., driver score, number of passengers, route of travel, time of travel) to an owner of the vehicle or the insurance cloud network. The method then continues to another continuation terminal ("terminal C4").

From terminal C4 (FIG. 7H), the method proceeds to block 7050 where the method receives from the mobile device, the vehicle, or the in-dash unit the mode of transportation (e.g., four-wheel vehicle, two-wheel vehicle, marine vehicle, or airplane). At block 7052, the method calculates an insurance rate using variables selected from the driver score, number of occupants, destination, route, weather, and so on. In a number of embodiments, the variables are selected from usage-based insurance variables. The method then continues to decision block 7054 where a test is performed to determine whether the vehicle is a peer-to-peer vehicle. If the answer to the test at decision block 7054 is No, the method proceeds to another continuation terminal ("terminal C5"). Otherwise, if the answer to the test at decision block 7054 is Yes, the method proceeds to block 7056 where the method calculates a sharing lender insurance rate by using variables selected from a lendee's score and an aggregate score. The method then continues to terminal C5.

From terminal C5 (FIG. 7I), the method proceeds to decision block 7058 where a test is performed to determine whether the owner of the vehicle intends to share the vehicle. If the answer to the test at decision block 7058 is Yes, the method proceeds to another continuation terminal ("terminal C6"). Otherwise, if the answer to the test at decision block 7058 is No, the method proceeds to block 7060 where the method recalculates the insurance rate so that it is different (e.g., higher and so on) from that of an owner who does not intend to share the vehicle. The method then continues to terminal C6 (FIG. 7I), and further proceeds to decision block 7062 where a test is performed to determine whether the owner or the insurance cloud network allows borrowing of the vehicle 104. In another embodiment, a renter can deny or allow a sub-renter to rent a vehicle based on the sub-renter driving score or intended usage. If the answer to the test at decision block 7062 is No, the method proceeds to terminal A4 and skips back to block 7024 where the above-identified processing steps are repeated. Otherwise, if the answer to the test at decision block 7062 is Yes, the method proceeds to terminal D.

From terminal D (FIG. 7A), the method proceeds to a set of method steps 7006 defined between a continuation terminal ("terminal E") and another continuation terminal ("terminal F"). The set of method steps 7006 monitors driving limits based on the insurance settings and calculates a new driver score. From terminal E (FIG. 7J), the method proceeds to block 7064 where the driver drives the vehicle. At block 7066, the method recalculates the driver score depending on the driving behavior of the driver in driving situations. At block 7068, the method facilitates the vehicle's communication, electrical, and diagnostic systems to communicate with the insurance cloud network, including the driver score. At decision block 7070, the method performs a test to determine whether the driving limits have been exceeded. If the answer to the test at decision block 7070 is No, the method proceeds to terminal E and skips back to block 7064 where the above-identified processing steps are repeated. Otherwise, if the answer to the test at decision block 7070 is Yes, the method proceeds to block 7072 where the method informs the driver that operation of the vehicle will be terminated after a certain time or distance. The method then continues to terminal F and terminates execution.

While illustrative embodiments have been illustrated and described, it will be appreciated that various changes can be made therein without departing from the spirit and scope of the invention.

The invention claimed is:

1. A system comprising:
   a vehicle not owned by a renter;
   a mobile device comprising hardware which limits operation of the vehicle by distance and time when the mobile device is inside the vehicle unless the mobile device receives instructions from the renter to purchase carsharing insurance to operate the vehicle to a destination selected on the mobile device by the renter; and
   a server coupled to a cloud network comprising hardware which associates the vehicle with the mobile device for executing hardware logic including:
   downloading a driver score and driving limits of the renter from the cloud network;
   limiting operation of the vehicle not owned by the renter by the driving limits;
   calculating carsharing insurance options to the renter based on the driver score;
   electronically displaying on the mobile device the carsharing insurance options;
   determining a current insurance coverage of the vehicle;
   electronically displaying the adequacy of the current insurance coverage;
   electronically soliciting purchase of carsharing insurance options to continue;
   electronically presenting a price for each carsharing insurance option; and
   electronically facilitating operation of the vehicle if the renter has selected to purchase a carsharing insurance option that adequately provides insurance coverage for the vehicle.

2. The system of claim 1, further comprising an in-dash unit housed in the vehicle comprising hardware which limits operation of the vehicle by distance and time when the renter is detected to be inside the vehicle unless the in-dash unit receives instructions from the renter to purchase carsharing insurance sufficient to operate the vehicle to a destination selected on the in-dash unit by the renter.

3. The system of claim 2, further comprising a driving limit monitor which has the capacity to monitor whether the renter has operated the vehicle beyond the distance and time.

4. The system of claim 3, further comprising an insurance coverage calculator which is capable of calculating insurance coverage options available to the renter.

5. The system of claim 4, further comprising an insurance rate calculator which is suitable for calculating an insurance rate for each insurance coverage option.

6. The system of claim 5, further comprising a driver score calculator which is capable of refreshing a calculation of a driver score to produce a refreshed driver score associated with the renter based on his driving behaviors and driving conditions.

7. The system of claim 6, further comprising an insurance cloud network which stores the refreshed driver score.

8. A system comprising:
   a vehicle not owned by a renter;
   an in-dash unit housed in the vehicle comprising hardware which limits operation of the vehicle by distance and time when the renter is detected to be inside the vehicle unless the in-dash unit receives instructions from the renter to purchase carsharing insurance to operate the vehicle to a destination selected on the in-dash unit by the renter; and a server coupled to a cloud network comprising hardware associates the vehicle with the in-dash unit for executing hardware logic including:

downloading a driver score and driving limits of the renter from the cloud network;

limiting operation of the vehicle not owned by the renter by the driving limits;

calculating carsharing insurance options to the renter based on the driver score;

electronically displaying on the in-dash unit the carsharing insurance options;

determining a current insurance coverage of the vehicle;

electronically displaying the adequacy of the current insurance coverage;

electronically soliciting purchase of carsharing insurance options to continue;

electronically presenting a price for each carsharing insurance option; and electronically facilitating operation of the vehicle if the renter has selected to purchase a carsharing insurance option that adequately provides insurance coverage for the vehicle.

* * * * *